(12) United States Patent
Coogle

(10) Patent No.: US 7,686,034 B1
(45) Date of Patent: Mar. 30, 2010

(54) AIR CONDITIONING CONDENSATE TREATMENT APPARATUS

(76) Inventor: Gregory Coogle, 492 NW. 162 Ave., Pembroke Pines, FL (US) 33028

( * ) Notice: Subject to any disclaimer, the term of this patent is extended or adjusted under 35 U.S.C. 154(b) by 423 days.

(21) Appl. No.: 11/796,794

(22) Filed: Apr. 30, 2007

Related U.S. Application Data

(63) Continuation-in-part of application No. 10/990,685, filed on Nov. 16, 2004, now abandoned, and a continuation-in-part of application No. 11/116,975, filed on Apr. 28, 2005, now abandoned.

(51) Int. Cl.
*F16L 37/00* (2006.01)
*G05D 7/00* (2006.01)

(52) U.S. Cl. .................. 137/558; 137/268; 422/264

(58) Field of Classification Search .............. 137/268, 137/558; 422/264, 266
See application file for complete search history.

(56) References Cited

U.S. PATENT DOCUMENTS

| | | | | |
|---|---|---|---|---|
| 5,201,339 A | * | 4/1993 | Buchan et al. | 137/268 |
| 5,402,813 A | * | 4/1995 | Keen | 137/15.16 |
| 5,976,364 A | * | 11/1999 | Williams | 210/136 |
| 6,068,023 A | * | 5/2000 | Potter | 137/625.47 |
| 6,651,690 B1 | * | 11/2003 | Coogle | 137/268 |
| 6,708,717 B1 | * | 3/2004 | Coogle | 137/240 |

* cited by examiner

*Primary Examiner*—Kevin L Lee
(74) *Attorney, Agent, or Firm*—Alvin S. Blum

(57) ABSTRACT

Apparatus applies chemicals to condensate water from an air conditioning condensate tray. It has an elongate body and a central cavity enclosed by an encircling wall. The central cavity receives chemicals to prevent the growth of microorganisms. A first tubular member is operatively connected at a first end to an aperture in the wall, and a second end extending outwardly for receiving condensate water from the condensate tray. A second tubular member is operatively connected to a second aperture in the wall opposite the first aperture aligned with the first member so that a cleaning brush may be passed through both members and into the condensate tray. Below the two tubular members a fluid outlet is provided with a connector for joining to a drainage system for draining the chemically treated condensate water from the cavity.

19 Claims, 5 Drawing Sheets

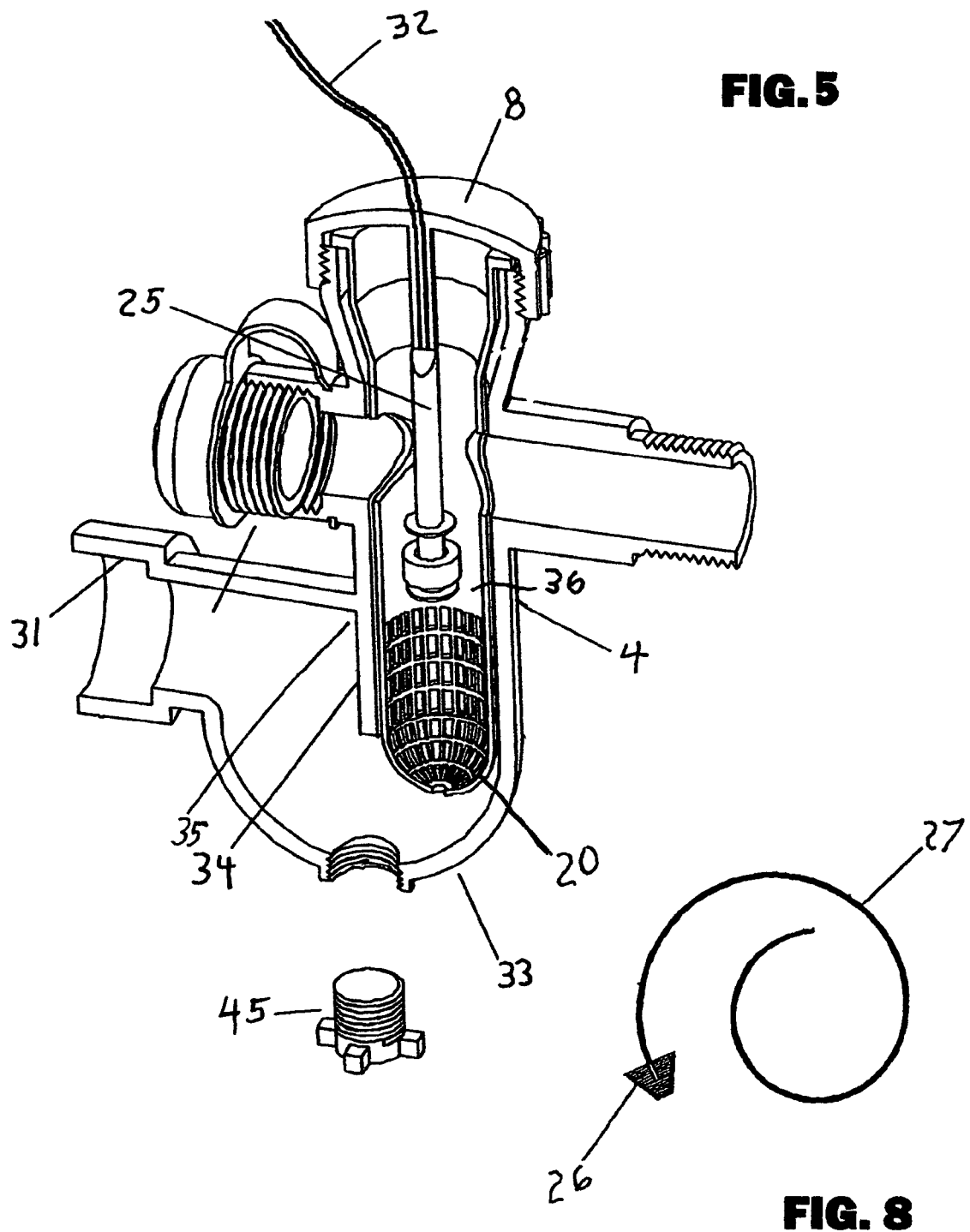

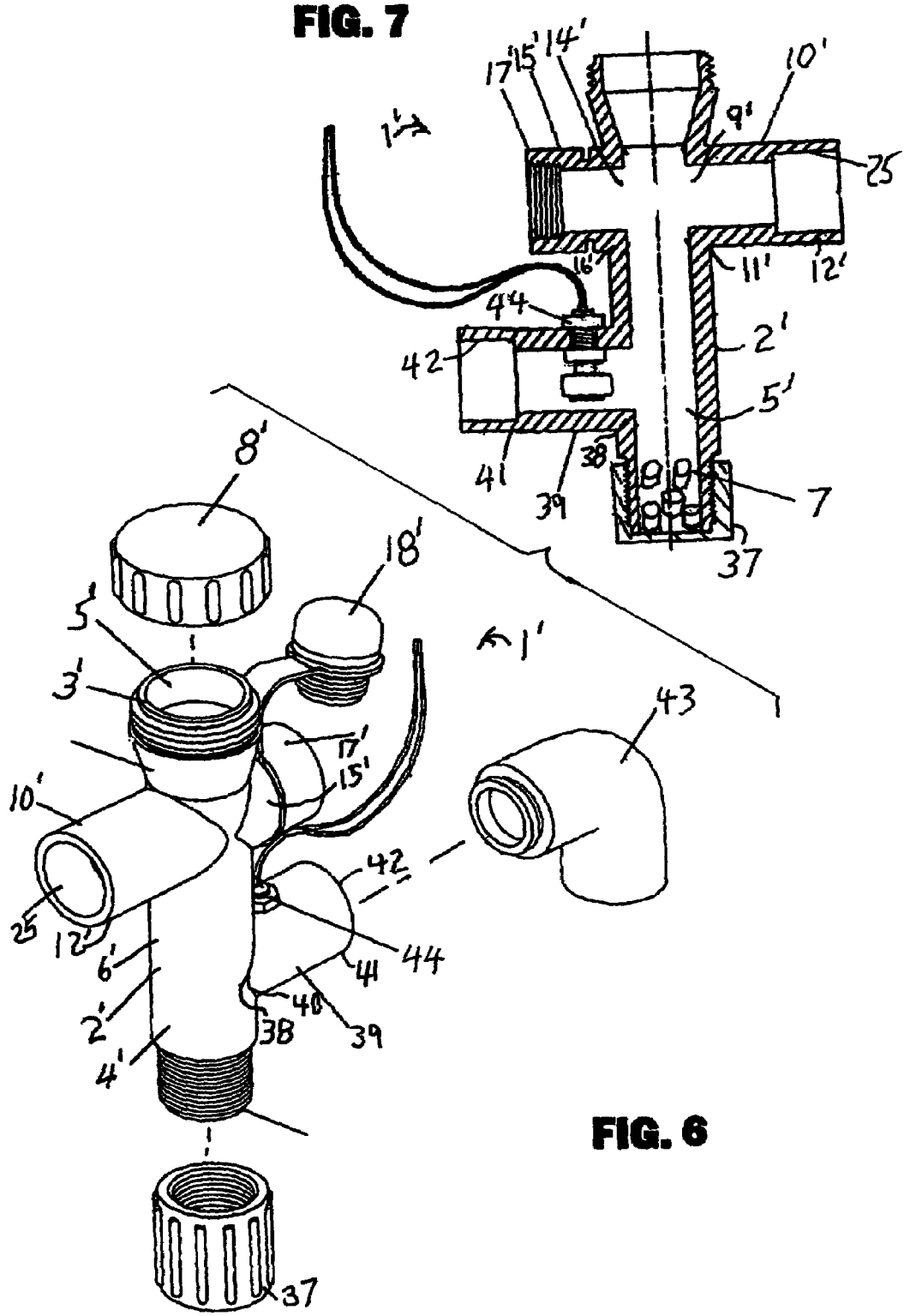

AIR CONDITIONING CONDENSATE TREATMENT APPARATUS

This application is a continuation-in-part of patent application Ser. No. 10/990,685 filed Nov. 16, 2004 now abandoned, and Ser. No. 11/116,975 filed Apr. 28, 2005 now abandoned, both incorporated herein by reference.

FIELD OF THE INVENTION

This invention relates generally to refrigeration systems, and more particularly to an apparatus for the chemical treatment of water from the condensate tray beneath the evaporator of an air conditioning unit.

BACKGROUND OF THE INVENTION

It is well known in the art to provide a receptacle such as a tray or pan beneath the evaporator coils of an air conditioner to receive water that condenses from the air as it is cooled. A drain pipe is generally connected to a side wall of the tray to drain the condensate water as it accumulates. Because water may stand still in the system, various microorganisms may grow in the tray and drain pipe until they clog up the drainage system. When this occurs, overflowing water may cause considerable damage. Because the drainage system and tray are out of sight and may be relatively inaccessible, they may be neglected until damage occurs. Various methods of applying antimicrobials to the drainage systems have been employed in the prior art. They have not been completely successful in overcoming the problem.

SUMMARY OF THE INVENTION

It is accordingly an object of the invention to provide a system that applies biocidal chemicals to a condensate tray drainage system that does not require access to the tray to replace the chemicals. It is another object that the apparatus of the invention provides cleaning access to the tray. Apparatus of the invention has an elongate reservoir body with an open upper end, a lower end, and a central cavity enclosed by an encircling wall. The central cavity receives chemicals through the open top. A top closure removably closes the central cavity. A tubular member is operatively connected at a first end to an aperture in the encircling wall, and has a second end extending outwardly therefrom. The second end is constructed for receiving condensate water from the condensate tray for providing a fluid passage for the water to the central cavity, and from there through drainage piping to a disposal site. In passing through the central cavity, the condensate water receives biocidal chemicals in concentration sufficient to suppress the growth of microorganisms in the drainage system. A cleanout structure is provided that enables a user to access the condensate tray through the apparatus to clean the tray with a long-handled brush in the common condition when direct access to the tray is limited.

These and other objects, features, and advantages of the invention will become more apparent from the detailed description of an exemplary embodiment thereof as illustrated in the accompanying drawings, in which like elements are designated by like reference characters in the various drawing figures.

BRIEF DESCRIPTION OF THE DRAWINGS

FIG. 5 is sectional view of another embodiment of the invention.

FIG. 6 is a partially exploded view of another embodiment of the invention.

FIG. 7 is sectional view of the embodiment of FIG. 6.

FIG. 8 is a plan view of a brush for cleaning the tray.

DETAILED DESCRIPTION OF PREFERRED EMBODIMENTS

Figure 1:
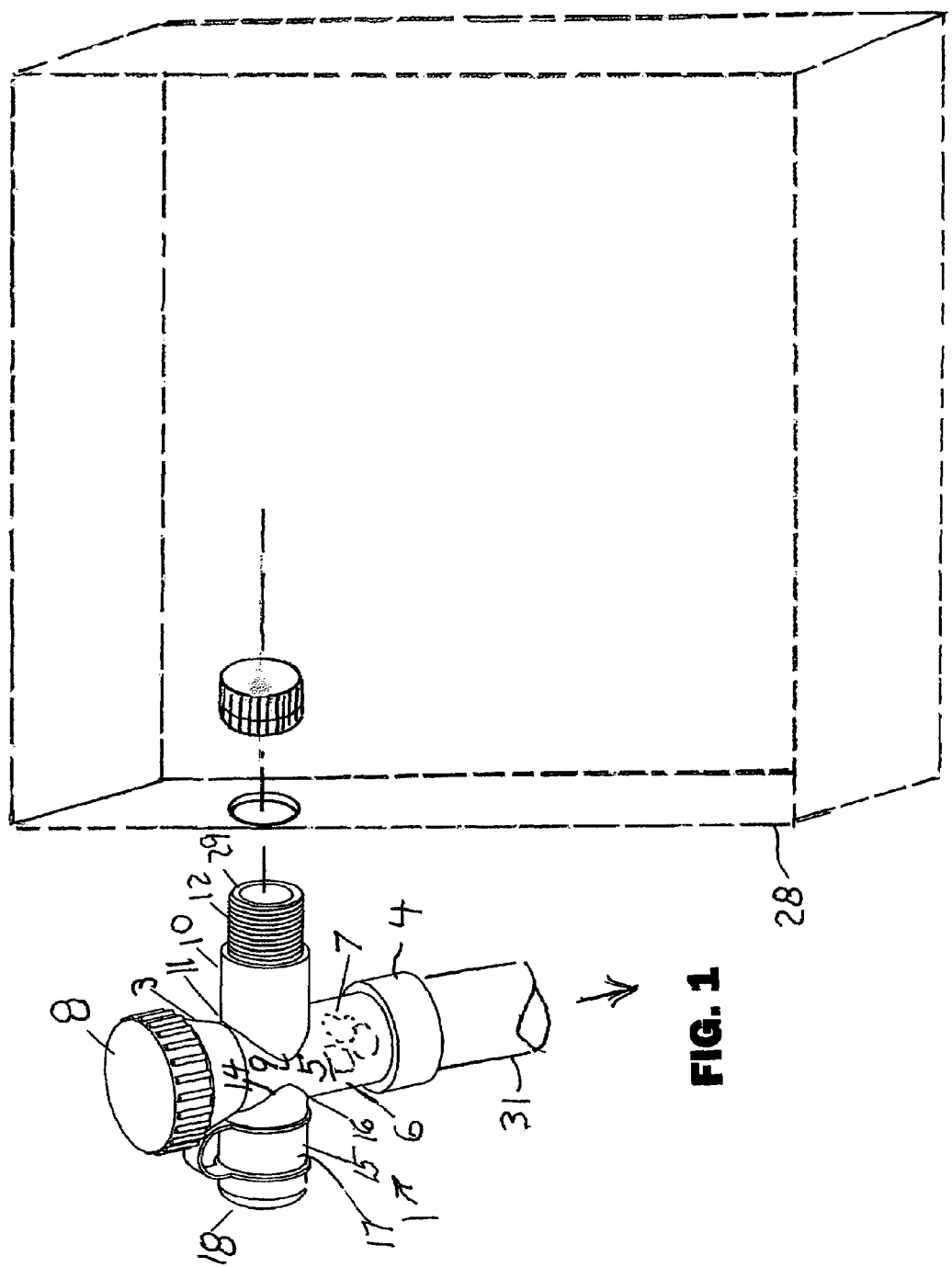
FIG. 1 is a perspective drawing of the invention.

Referring now first to the FIGS. 1-5, apparatus 1 of the invention includes an elongate reservoir body 2, having an open lower end 4, and an open upper end 3 with a removable top closure 8 that may be unscrewed to permit access to the central cavity 5 into which may be deposited one or more biocidal chemicals 7 (shown in phantom) of the type well known in the art for suppressing the growth of organisms in condensate water. The central cavity is enclosed by an encircling wall 6. A first aperture 9 in the wall 6 is operatively sealed to a first end 11 of a tubular member 10 to provide a passage for water from a condensate drain tray 28 (shown in phantom) to enter the cavity 5. A second end 12 of the member 10 is constructed with connection means 25 for connecting to the condensate tray. As best seen in FIG. 1, a condensate tray 28 of the type installed beneath the evaporator coils 29 (shown in phantom) of an air conditioner (not shown) receives water that condenses from the air passing over the chilling coils. Water that accumulates in the tray drains from the tray to the outside through apparatus 1 to a drain assembly 31. A second aperture 14 in the encircling wall is provided directly opposite the first aperture 9. A second tubular member 15 is operatively connected at its first end 16 to the second aperture. A second end 17 of tubular member 15 is provided with a removable tethered covering 18. The first and second tubular members are aligned so that the brush 26 with elongate flexible handle 27 of FIG. 8 may be passed through from end 17 of member 15, through the cavity 5, and then through member 10 and into the condensate tray 28 to clean it.

Since condensate water drains very slowly and is stagnant at times, it tends to grow microorganisms that lead to clogging of the drain systems and then overflowing of the drain with damage. Some systems of the prior art apply biocidal chemicals directly to the tray in the form of slowly dissolving tablets. Direct access to the tray may be awkward in some installations. The second end 12 of the tubular member 10 is operatively connected by a connection means to the tray. All of the connection means may be any means well known in the art such as: gasketed screw joints, ferrule joints, and cemented sleeve joints. When the tray is constructed of a plastic, cemented slip joints generally used for the plastic piping may be used, for example. A threaded assembly is shown here for illustration purposes. As water in the tray increases, water flows from the tray into the central cavity 5. Chemicals dissolved from the chemical source 7 in the cavity 5 will move with the water through the lower end and into the drain 31 where it will suppress the growth of microorganisms.

A perforated basket 20 is removably fitted into the cavity 5. The basket has a pair of apertures 21 dimensioned and positionable so as to align with the two tubular members, 10 and 15 to enable the brush 26 to pass through. Biocidal chemicals 7 (shown in phantom) are deposited in the basket as needed, and the basket deposited in the central cavity through the upper open end 3. The open lower end 4 of the elongate body 2 is provided with connecting means 19 for connecting to drainage conduit 31 which may be a pipe assembly that leads to the outside. Condensate water flowing from the condensate tray through tubular member 10 into central cavity 5 containing chemicals 7 in the basket then drain out through end 4 and into the drainage conduit. There are conditions in which noxious gases may pass through the conduit system and into the air of the air handling system. FIG. 5 shows an embodiment of the invention to overcome the problem. A water trap 33 is interposed between the lower end 4 of the elongate body and the conduit 31. When water sits in the trap above the level of barrier 34, the conduit air space 35 is isolated from the air space 36 of the central cavity by the barrier. A plug 45 facilitates trap cleanout.

Figure 2:
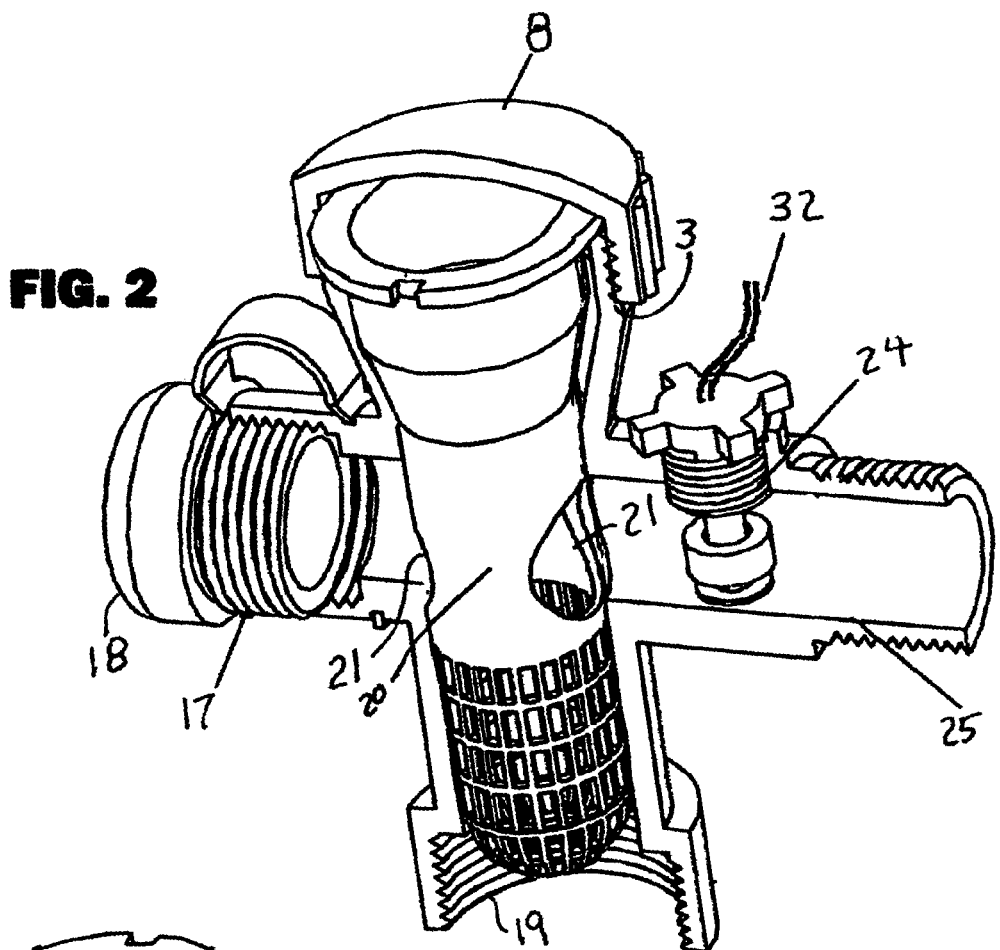
FIG. 2 is a partial sectional view of another embodiment of the invention.
Figure 3:
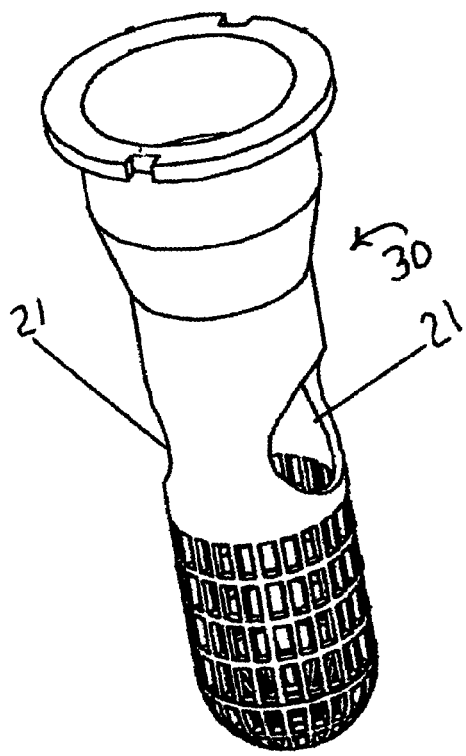
FIG. 3 is a perspective view of the basket of FIG. 2.
Figure 4:
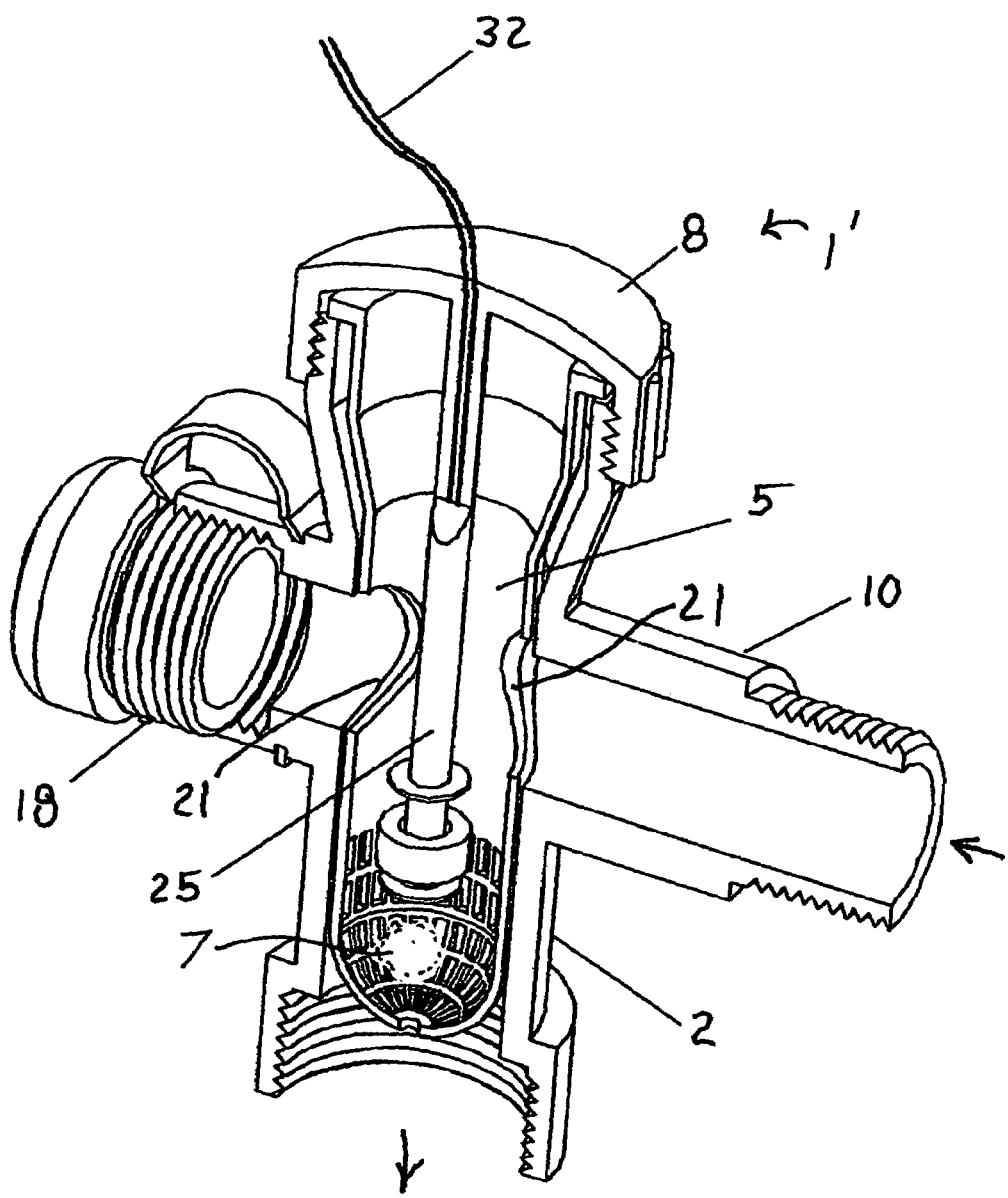
FIG. 4 is a sectional view of another embodiment of the invention.

As best seen in FIG. 2, the tubular member 10 may optionally be provided with a fluid level sensor 24. The sensor provides a signal through wires 32 to inactivate electrically powered equipment such as an air handler motor and/or air conditioning compressor motor (not shown) when the liquid level in the tubular member reaches a preset level.

As best seen in FIG. 5, the closure 8 may optionally be provided with a fluid level sensor 25 having a sensing element within that rests inside the central cavity when the closure is in place. The sensor provides a signal through wires 32 to inactivate electrically powered equipment such as an air handler motor and/or air conditioning compressor motor (not shown) when the liquid level in the central cavity reaches a preset level.

The fluid levels sensors may be any of those well known in the art.

Referring now to drawing FIGS. 6 and 7, another embodiment 1' of the invention is shown. An elongate body 2' has an open upper end 3', an open lower end 4' and an encircling wall 6' defining a central cavity 5'. A top enclosure 8' removably connected to the upper end may be removed to admit biocidal chemicals 7 directly to the central cavity, or alternatively, to admit a perforated basket with chemicals (not shown) as described above. A bottom closure 37 closes off the bottom end 4' to retain the chemicals. A first aperture 9' in the wall 6' is operatively sealed to a first end 11' of a tubular member 10' to provide a passage for water from a condensate drain tray to enter the cavity 5'. A second end 12' of the member 10' is constructed with connection means 25 for connecting to the condensate tray. A second aperture 14' in the encircling wall is provided directly opposite the first aperture 9'. A second tubular member 15' is operatively connected at its first end 16' to the second aperture. A second end 17' of tubular member 15' is provided with a removable tethered covering 18'. The first and second tubular members are aligned so that the brush 26 with elongate flexible handle 27 of FIG. 8 may be passed through from end 17' of member 15', through the cavity 5', and then through member 10' and into the condensate tray (not shown) to clean it.

A third aperture 38 in the wall is disposed below the first and second apertures. A third tubular member 39 has a first end 40 operatively connected to the aperture 38 and a second end 41 provided with connection means 42 for operatively connecting to a drain 43 to provide a fluid outlet in fluid communication with the chemically treated condensate water in the central cavity.

A fluid level sensor 44 may be employed in a tubular member as shown, or in the top closure (not shown) as described above.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. Apparatus for applying chemicals to condensate water from an air conditioning condensate tray, the apparatus comprising:

an elongate reservoir body having an open upper end, a lower end, and a central cavity enclosed by an encircling wall, the central cavity constructed to receive chemicals therein;

a top closure removably connected to the upper end for closing the upper end;

a first aperture in the encircling wall;

a first tubular member operatively connected at a first end to the first aperture and having a second end extending horizontally outwardly therefrom;

the second end constructed for receiving condensate water from the condensate tray for providing a fluid passage for the water to the central cavity;

a second aperture in the encircling wall directly opposing the first aperture;

a second tubular member operatively connected at a first end to the second aperture and having a second end extending horizontally outwardly therefrom, and aligned with the first tubular member;

the second end of the second tubular member provided with a removable covering;

a fluid outlet in fluid communication with the central cavity, the fluid outlet disposed below the first tubular member to enhance gravitational forces on fluid drainage; and connection means at the fluid outlet for operative fluid communication with a drainage apparatus.

2. The apparatus according to claim 1 further comprising a perforated basket removably fitted within the central cavity for holding biocidal chemicals.

3. The apparatus according to claim 2 in which the basket has a pair of apertures dimensioned and positionable so as to align with the first and second apertures.

4. The apparatus according to claim 1 further comprising a brush on an elongate handle dimensioned to pass through the second and first tubular members to enable cleaning of a condensate tray connected to the second end of the first tubular member.

5. The apparatus according to claim 1 in which the fluid outlet extends downwardly from the lower end of the reservoir body.

6. The apparatus according to claim 5 further comprising a fluid level sensor in the top closure constructed to signal to disconnect electric motor apparatus when fluid level in the central cavity exceeds a preset level.

7. The apparatus according to claim 1 in which the fluid outlet extends horizontally outwardly from the reservoir body below the first tubular member; and the lower end of the reservoir body is closed.

8. The apparatus according to claim 7 further comprising a fluid sensor in the fluid outlet constructed to signal to disconnect electric motor apparatus when fluid level in the outlet exceeds a preset level.

9. Apparatus for applying chemicals to condensate water from an air conditioning condensate tray, the apparatus comprising:

an elongate reservoir body having an open upper end, a open lower end, and a central cavity enclosed by an encircling wall, the central cavity constructed to receive chemicals therein;

a top closure removably connected to the upper end for closing the upper end;
a first aperture in the encircling wall;
a first tubular member operatively connected at a first end to the first aperture and having a second end extending horizontally outwardly therefrom;
the second end constructed for receiving condensate water from the condensate tray for providing a fluid passage for the water to the central cavity;
a second aperture in the encircling wall directly opposing the first aperture;
a second tubular member operatively connected at a first end to the second aperture and having a second end extending horizontally outwardly therefrom, and aligned with the first tubular member;
the second end of the second tubular member provided with a removable coveting;
the open lower end comprising a fluid outlet in fluid communication with the central cavity; and
connecting means at the open lower end for sealingly connecting to a drainage conduit.

10. The apparatus according to claim 9 further comprising a perforated basket removably fitted within the central cavity for holding biocidal chemicals, and in which the basket has a pair of apertures dimensioned and positionable so as to align with the first and second apertures.

11. The apparatus according to claim 9 further comprising a brush on an elongate handle dimensioned to pass through the second and first tubular members to enable cleaning of a condensate tray connected to the second end of the first tubular member.

12. The apparatus according to claim 9 further comprising a fluid level sensor in the top closure constructed to signal to disconnect electric motor apparatus when fluid level in the central cavity exceeds a preset level.

13. The apparatus according to claim 9 further comprising a trap interposed between the lower end and the drainage conduit, the trap providing a water barrier between gas space in the drainage conduit and gas space in the central cavity.

14. Apparatus for applying chemicals to condensate water from an air conditioning condensate tray, the apparatus comprising:
an elongate reservoir body having an open upper end, a lower end, and a central cavity enclosed by an encircling wall, the central cavity constructed to receive chemicals therein;
a top closure removably connected to the upper end for closing the upper end;
a bottom closure removably connected to the lower end for closing the lower end;
a first aperture in the encircling wall;
a first tubular member operatively connected at a first end to the first aperture and having a second end extending horizontally outwardly therefrom;
the second end constructed for receiving condensate water from the condensate tray for providing a fluid passage for the condensate water to the central cavity;
a second aperture in the encircling wall directly opposing the first aperture;
a third aperture in the encircling wall disposed below the first and second apertures;
a second tubular member operatively connected at a first end to the second aperture and having a second end extending horizontally outward therefrom, and aligned with the first tubular member;
the second end of the second tubular member provided with a removable covering; and
a third tubular member having a first end operatively connected to the third aperture and a second end provided with connection means for operatively connecting to a drainage conduit to provide a fluid outlet in fluid communication with the central cavity.

15. The apparatus according to claim 14 further comprising a perforated basket removably fitted within the central cavity for holding biocidal chemicals.

16. The apparatus according to claim 15 in which the basket has a pair of apertures dimensioned and positionable so as to align with the first and second apertures.

17. The apparatus according to claim 14 further comprising a brush on an elongate handle dimensioned to pass through the second and first tubular members to enable cleaning of a condensate tray connected to the second end of the first tubular member.

18. The apparatus according to claim 14 further comprising a fluid level sensor in the top closure constructed to signal to disconnect electric motor apparatus when fluid level in the central cavity exceeds a preset level.

19. The apparatus according to claim 14 further comprising a fluid sensor in the third tubular member constructed to signal to disconnect electric motor apparatus when fluid level in the third tubular member exceeds a preset level.

* * * * *